Figure 1:
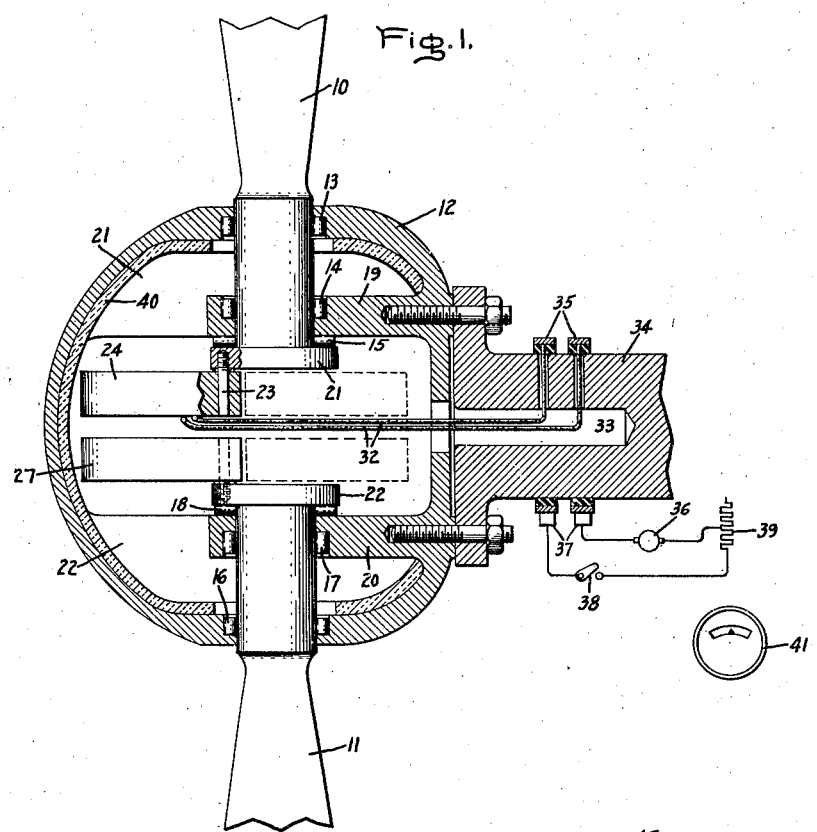

May 24, 1938.  N. E. G. MEIJER  2,118,654
CONTROL DEVICE
Filed June 19, 1935  2 Sheets-Sheet 1

Inventor:
Nicolaas E. Groeneveld Meijer,
by Harry E. Dunham
His Attorney.

May 24, 1938.  N. E. G. MEIJER  2,118,654
CONTROL DEVICE
Filed June 19, 1935  2 Sheets-Sheet 2

Inventor:
Nicolaas E. Groeneveld Meijer,
by Harry E. Dunham
His Attorney.

Patented May 24, 1938

2,118,654

UNITED STATES PATENT OFFICE 2,118,654

CONTROL DEVICE

Nicolaas E. Groeneveld Meijer, Schenectady, N. Y., assignor to General Electric Company, a corporation of New York Application June 19, 1935, Serial No. 27,413
In Germany December 8, 1934

2 Claims. (Cl. 170—163)

This invention relates to control devices, more particularly to devices for producing a controlling action on a rotating body, and it has for an object the provision of a simple, reliable and improved device of this character.

For example in certain types of machinery it may be desired to change the setting of a valve mounted on a rotating part of the machine. Likewise in certain types of governors, it may be desired to change the setting of a control device mounted on a rotating machine part; or in case of a propeller for aircraft and the like, it is often desired to control or vary the pitch of the blade inclination for the purpose of obtaining the maximum output from the engine.

Heretofore, various mechanical or hydraulic devices have been utilized for this purpose, and although some of these devices have been satisfactory, all have left something to be desired. In the example of the variable pitch aircraft propeller the high rotational speeds involved, introduce complications. The very considerable centrifugal forces as well as the vibrations set up in the propeller as a result of the impact of explosions in the motor cylinders, shorten the life and interfere with the proper operation of any complicated mechanism in the propeller hub. On the other hand the large forces required to turn the blades have in many designs required a large number of parts, in order to multiply a small force to the required magnitude. This has required careful designing and accurate construction in order not to introduce further complications such as unbalance and centrifugal forces within the mechanism. All these factors add to the complexity of the device itself and to the manufacturing cost as well.

Accordingly, an object of this invention is the provision of a device of this character which is extremely simple in construction, has a minimum of moving parts, develops a large force with a small movement, is easily designed and inexpensive to manufacture.

In carrying the invention into effect in one form thereof, a thermal adjusting element is mounted on a rotating part, for example the hub of an aircraft propeller and means are provided for supplying heat to the adjusting element to cause it to deform and develop a large force for adjusting the pitch of the blades. The adjusting element may be heated either by electric power or by live exhaust gases from the engine or steam from a turbine. The heated adjusting element itself may be of any suitable type such for example as a bimetallic element, a bellows diaphragm filled with suitable gas or liquid, a metal rod, or a liquid cylinder with an operating piston. The application of heat to these elements causes small displacements or deformations and relatively large forces which conditions correspond to the requirements of a pitch adjusting device for propeller blades.

A further advantage is the comparatively small weight so that only small centrifugal forces are developed which do not seriously interfere with reliable operation. In addition, such an adjusting device requires only a small amount of supervision during the operation. It does not require a complicated control system, as the electric power can be transmitted in a simple manner over sliding or rotating contacts to the adjusting elements which usually are located within the propeller hub. If the adjusting element is heated by exhaust gases or steam, these can be easily conducted to the hub.

Figure 3:
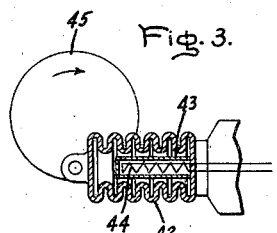
Figure 2:
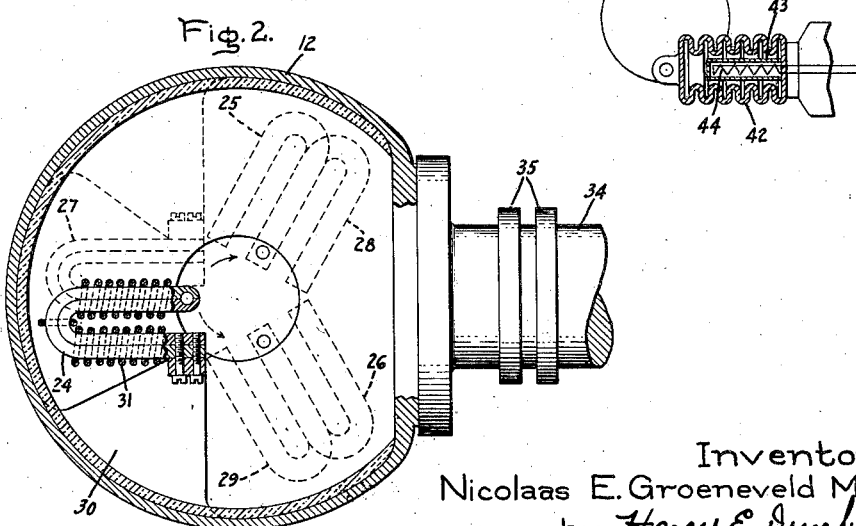
Figure 4:
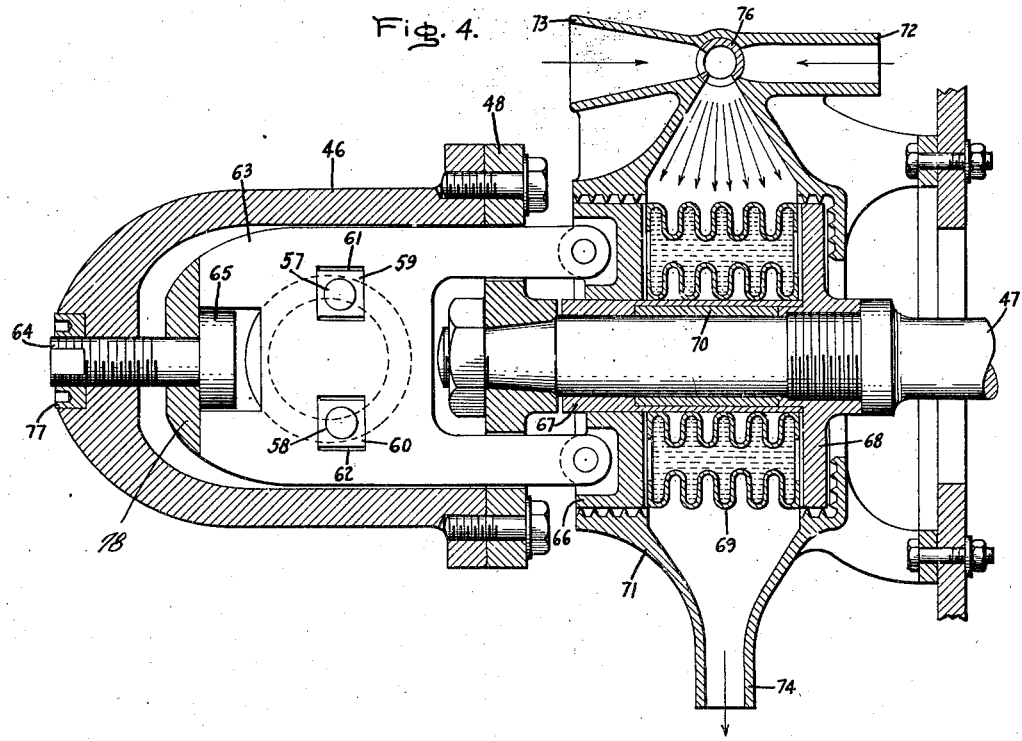
Figure 5:
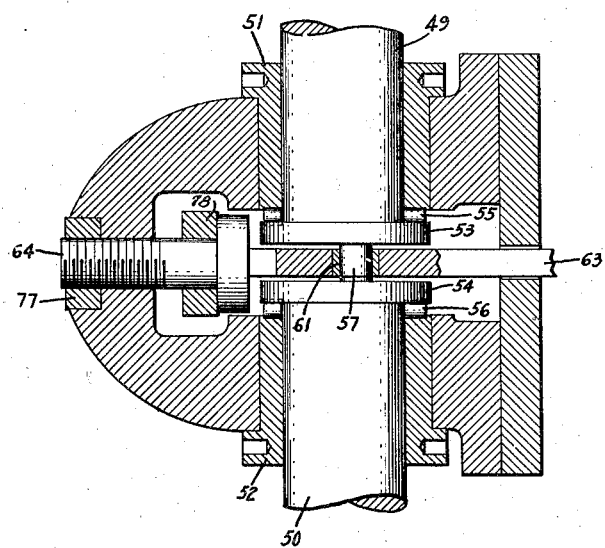

For a better and more complete understanding of the invention, reference should now be had to the following specification and to the accompanying drawings in which Fig. 1 is a view of an embodiment of the invention partly in section; Fig. 2 is a plan view partly in section of Fig. 1; Fig. 3 is a detail of a modification; Fig. 4 is a sectional view of a modification; and Fig. 5 is a detail of the modification of Fig. 4.

Referring now to the drawings a pair of propeller blades 10 and 11 are mounted in the propeller hub 12 for rotation about their longitudinal axes. The propeller blades are rotatably mounted in any suitable type of bearings, such for example as ball or roller bearings. As shown, the blades 10 and 11 are mounted in roller bearings 13, 14, 15 and 16, 17, 18 respectively. The races for the bearings 13 and 16 are suitably mounted in the hub, whilst the races for the bearings 14 and 17 are carried by the supporting arms 19, 20 which are preferably formed integrally with the hub. The bearings 13, 14 and 16, 17 serve as guide bearings for rotation of the blades about their own axes and the bearings 15 and 18 take the centrifugal thrust of the blades 10 and 11 respectively.

Although the roots of the blades 10 and 11 may take many different forms, they are shown as provided with control discs 21 and 22 respectively each provided with a number of pins or studs 23.

A suitable number of U-shaped bimetallic thermostatic elements are provided for adjusting the pitch of each blade. In the illustrated embodiment, three bimetallic elements 24, 25 and 26 are provided for the blade 10, and a similar number of bimetallic elements 27, 28 and 29 are provided for the blade 11. These elements are arranged concentrically and symmetrically with respect to the blade axis as shown. Any suitable bimetallic element may be utilized. For example, an element in which the low coefficient material is an alloy of 36% nickel and 64% iron and the high coefficient material is brass, is entirely satisfactory. A greater or lesser number of elements may be used to suit any particular design.

One end of the bimetallic element 24 is rigidly connected to a web or plate 30 which is integral with the hub or connected thereto by suitable fastening means. The opposite end of the element 24 is provided with a hole in which one of the pins 23 engages. The remaining thermostatic elements are similarly mounted in the hub and connected to the blades as indicated in the drawings.

The bimetallic elements are heated by an electric heating element 31 which is connected by means of conductors 32 which pass through a bore 33 in the motor shaft or propeller shaft 34 to the slip rings 35. These rings 35 are connected to a source of electric power, illustrated as a generator 36, by means of the brushes 37. A switching device 38 and a variable resistance 39 are included in circuit.

When the pitch of the propeller blades is to be adjusted, then the switch 38 is closed. The heating current in the heating element 31 can then be regulated by means of the variable resistance 39. Heating of these bimetallic elements causes their free ends to attempt to bend outwardly. If this bending is resisted these elements develop large forces, which cause rotation of the control discs 21 and 22 and consequently of the blade shafts in the directions of the arrows shown in the drawings.

The adjusting motion terminates as soon as equilibrium is established between the supplied heat and the cooling by radiation and conduction. In order to reduce the heat losses as much as possible, the inside of the propeller hub 12 can be covered with a thermal insulating layer 40.

As the temperature of the bimetallic elements is a measure of the inclination of the propeller blades, an indicating device 41 is provided. This device may be an ammeter. If the voltage of the source 36 is substantially constant, the magnitude of the current in the circuit as measured by the ammeter depends upon the resistance of the circuit which in turn depends upon the temperature of the heating circuit. Likewise, the temperature of the bimetallic element and the degree of blade inclination depend upon the temperature of the heating circuit. Consequently, the ammeter may be calibrated in terms of blade inclination or pitch.

In the construction shown in Fig. 3, as already stated, the electrically heated adjusting element is designed as a bellows diaphragm 42. This diaphragm is filled with liquid, preferably with a liquid which has a high thermal coefficient of expansion. Within the diaphragm there is provided a small tubular member 43 in which a heating element 44 is located. The right hand end of the bellows diaphragm is supported against an extension of the propeller hub, while the left end acts on the control bolt of the control disc 45 constituting the root end of the propeller blade. If the heating wire 44 is heated by closing the electric circuit, then the liquid located in the diaphragm expands, produces a large force which in turn produces an adjustment of the control disc 45 and consequently of the blade shafts in the direction of the arrow shown in the drawings.

In the modification of Figs. 4 and 5, the adjusting element is heated by the inlet gases or exhaust gases of the propeller drive motor. This makes it possible to utilize the thermal adjusting element in those cases in which no electric power is available or the amount available is insufficient.

If an arrangement is provided for supplying a cooling air current to the thermal adjusting element for producing pitch variations opposite to those produced by heating, then it is preferred to supply the cooling air and the heating gases to a common connection and to provide a control element at the point where the two supply lines join. Reversing operation of this control element provides for selectively supplying either the heating gases or the cooling air to the thermal adjusting element.

In this further modification of the invention, the rotating adjustment element is surrounded by a stationary housing, to which the supply lines of the heating gases and of the cooling air are connected. The stationary housing is sealed with respect to the rotating adjusting element, by suitable means such as a labyrinth seal, in order to prevent the heating gases from escaping before the heating of the adjusting element is completed. If a bellows diaphragm is used as the adjusting element, then a particularly simple construction is obtained by arranging the bellows diaphragm units so as to surround the motor shaft, in which case suitable insulation can be provided between the diaphragm and the motor shaft in order to prevent the heat from being transmitted to the motor shaft.

As shown in Fig. 4 and Fig. 5, the propeller hub 46 is fastened to the motor shaft 47 by means of the flange 48. Within this hub 46 the two blade shafts 49 and 50 are mounted in bearing bushings 51 and 52, respectively, for rotation about their longitudinal axes. The root ends of the blade shafts 49 and 50 are provided with discs 53 and 54 respectively. By means of these discs, the blade shafts 49 and 50 are held in place against the inside surfaces of the bearing bushings 53 and 54 through the intermediary of roller bearings 55 and 56 respectively.

The discs 53 and 54 of the blade shafts are provided with adjusting bolts or studs 57, 58 respectively which are placed eccentrically with respect to the center of the blade shafts. These two adjusting bolts 57, 58 are held in sliding elements 59 and 60, respectively, which in turn cooperate with slots 61 and 62, respectively, of the adjustment yoke 63 so that they can be moved in a circular path when the yoke is moved axially in the hub. When the adjustment yoke is displaced axially with respect to the hub, it is clear that if one blade is rotated in one direction, the other blade is rotated in the opposite direction. The left end of this yoke 63 is provided with a hole to permit axial displacement along the guide bolt 64. This guide bolt is preferably screw threaded into the propeller hub and has on its right end a head 65 which limits the displacement of the adjustment yoke to the right.

The forked end of the adjustment yoke is fastened to a flange 66 which is slidably mounted on the bushing 67, which is, in turn, fixedly secured to the motor shaft 47. On the motor shaft 47, a second flange 68 is provided, which together with the flange 66 encloses the thermal adjusting element illustrated as a bellows diaphragm 69, mounted on the flanges 66 and 68 so as to rotate with the motor shaft. This diaphragm is mounted concentrically with respect to the bushing 67, and consequently concentrically with respect to the motor shaft 47, while suitable insulation 70 placed in a turned part of the bushing 67, prevents the transmission of heat from the diaphragm to the motor shaft.

The diaphragm 69 is filled with a liquid which causes an axial change in the length of the diaphragm when it is heated, thereby producing an axial displacement of the adjusting yoke 63 to the left. This displacement of the adjustment yoke 63 causes a rotation of the blade shafts in such a way that one blade is rotated to the left, while the other is rotated to the right.

The bellows diaphragm 69, which rotates with the motor shaft 47 since it is fastened to the flanges 66 and 68 is enclosed in a stationary housing 71 to the upper part of which the two supply lines 72 and 73 for the heating gases and the cooling air respectively are connected, and whose lower part is designed as the outlet 74 for the heating gases and the cooling air. The stationary housing 71 is provided with a labyrinth seal on the inside walls thereof which lie opposite to the flanges 66 and 68 in order to prevent escape of the heating gases, to the greatest possible extent.

At the connection point of the two supply lines 72 and 73 with the housing 71, a control element illustrated as a three way valve 76 is provided. By changing the position of this element either the cooling air line 73, as shown, or the heating gas line can be connected to the inside of the housing 71. The control element 76 can, if necessary, be placed in intermediate positions in which it admits both cooling air and also heating gas or only a part of the heating gas or of the cooling air. In this manner, a simple regulating means is provided for the thermal power to be supplied.

The normal position of the propeller occurs when by proper setting of valve 76 air flows over the bellows to keep them cool. When the pilot desires to change the pitch of his propeller, he turns valve 76 to a position in which it admits hot exhaust gases into housing 71. These hot gases heat the bellows which consequently expand in an axial direction, thereby displacing yoke 63 forward (to the left in the drawings). As a result the propeller blades are rotated as previously described.

The amount of pitch changing can be regulated by regulating the quantity of exhaust gases which flow through the heating chamber formed by the housing. This is done by choosing a corresponding setting of the valve 76.

Should it become necessary to return the propeller blades to the original position, valve 76 is turned in such a way as to admit fresh cool air over the bellows. This will cause the bellows to contract, and the blades will return to their normal position through the action of forces which tend to restore them to their original positions. In addition to these forces, which may be the result of aerodynamic pressure, centrifugal action of counterweights or spring action, the spring effect of the bellows also tends to return the blades to their original position. In order to prevent the blades from being turned back too far in cold weather, an adjustable stop consisting of the bolt 64 which prevents yoke 63 from moving too far to the right, is provided. This bolt 64 is held tight by nut 77 in the nose of the propeller. In "cold" position flange 78 rests against head 65 of bolt 64.

For normal flying and temperature conditions the position of valve 76 will be an indication of the propeller pitch.

This construction provides for a large range of pitch variation. The arrangement illustrated provides a pitch variation range of approximately 22 degrees, but by proper selection of the bellows length, permissible bellows temperatures and suitable arrangement of yoke and pins the pitch can be varied as much as 90 degrees if desired.

The forces exerted by the expanding bellows are a multiple of the forces necessary to overcome the resultant of aerodynamic and centrifugal torques and the frictional torques in thrust- and lateral-blade bearings. The available pitch-changing forces being so large, there should hardly be any need for lateral ball- or roller-bearings, which will permit the use of simple sleeve bearings or bushings, which affords an inexpensive and reliable construction.

Although in accordance with the provisions of the patent statutes this invention is illustrated as embodied in concrete form, it will be understood that the apparatus shown and described is merely illustrative, and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A controllable pitch propeller comprising in combination a hub having a substantially completely enclosed housing member, a plurality of propeller blades having their roots rotatably mounted within said housing member to provide for rotation of said blades about their longitudinal axes, said roots being separated to provide a space, a plurality of thermal responsive elements for each of said blades mounted in said space, the elements for each of said blades being spaced at substantially equal circumferential intervals about the longitudinal blade axis and each having one extremity connected to said hub and the other connected to its associated blade root, an electric heating coil for each of said thermal responsive elements, and a source of electric power external to said housing member, and electrical connections from said source to said coils for supplying electric energy to said coils thereby to cause said thermal responsive elements to produce a force to rotate said blades about said axes.

2. A controllable pitch propeller comprising a substantially completely enclosed hollow hub member, a plurality of propeller blades having their roots rotatably mounted within said hub member to provide for rotation of said blades about their longitudinal axes, each of said blade roots having a flanged portion forming a disc, said discs being separated to provide a space, a plurality of supporting arms one for each blade within said hub, antifriction guide bearings for said blades carried by said arms, thrust bearings arranged between said discs and supporting arms, a plurality of U-shaped bimetallic themostatic elements for each of said blades arranged within said space, the elements for each blade being substantially equally spaced circumferentially about the axis of the blade and each having one extremity fastened to its associated disc and the other to said hub, an electric heating coil on each of said elements, and electrical connections from said coils to an external source of power for supplying power to said coils to cause said elements to produce a force to rotate said blades about said axes.

NICOLAAS E. GROENEVELD MEIJER.